Figure 1:
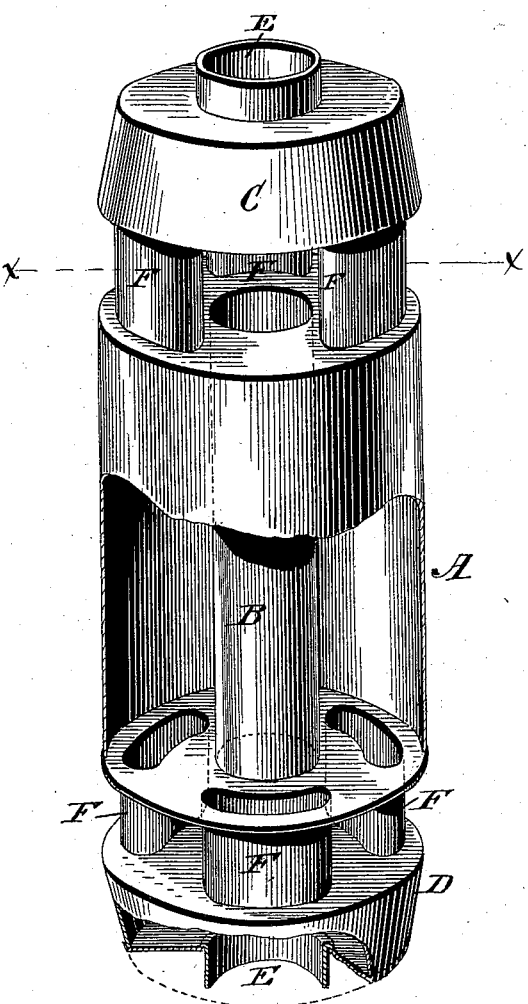

(No Model.)

J. P. LYNOTT.
HEAT RADIATING DRUM.

No. 557,211.   Patented Mar. 31, 1896.

Witnesses
J. J. Williamson
Jnus D. Morris

Inventor
John P. Lynott
per Chas. H. Fowler
Attorney.

UNITED STATES PATENT OFFICE.

JOHN P. LYNOTT, OF LOUISIANA, MISSOURI.

HEAT-RADIATING DRUM.

SPECIFICATION forming part of Letters Patent No. 557,211, dated March 31, 1896.

Application filed January 30, 1896. Serial No. 577,401. (No model.)

*To all whom it may concern:*

Be it known that I, JOHN P. LYNOTT, a citizen of the United States, residing at Louisiana, in the county of Pike and State of Missouri, have invented certain new and useful Improvements in Heat-Radiating Drums; and I do hereby declare that the following is a full, clear, and exact description of the same, reference being had to the annexed drawings, making a part of this specification, and to the letters of reference marked thereon.

The present invention has for its object to provide a hot-air-radiating drum whereby the volume of air to be heated is materially increased and a greater circulation and distribution of the air is more readily effected for the purpose of radiation; and the invention consists in a drum constructed substantially as shown in the drawings and hereinafter described and claimed.

Figure 2:
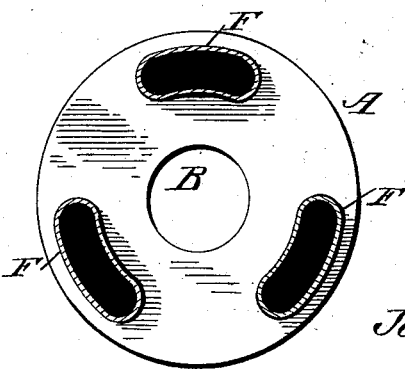

Figure 1 of the drawings represents a perspective view of a drum constructed in accordance with my invention, showing a portion of one of the end air-chambers and the drum partly broken away to show the interior construction thereof; Fig. 2, a horizontal section taken on line $x\ x$ of Fig. 1.

In the accompanying drawings, A represents a cylindrical drum of any suitable size and having closed ends and a central pipe B, which extends out through the ends of the drum and is for the purpose of a rapid circulation of air through it, caused by the heat of the drum.

At the ends of the drum A are the air-chambers C D, respectively, which chambers communicate with the interior of the drum through tubular supports F. These tubular supports are oblong in cross-section, as shown in Fig. 2 of the drawings, to obtain greater radiating-surface at the ends of the drum, three supports constituting each set, and the supports of one set being so arranged with relation to those of the other set that they will be on line with the spaces between them, thereby rendering the effect of radiation much greater. The chambers C D have openings E for the air to enter and be discharged, the air passing into the chamber D and through the tubular supports into the drum and thence through the tubular supports of the chamber C into said chamber, from which it escapes. It will therefore be seen that a most perfect radiation of the heated air is effected, and the advantage in the oblong shape of tubular supports enables a much smaller drum to be used and at the same time obtain the same heating-surface as were the supports cylindrical, thus confining the heat in a smaller space and in proportion increasing its effect of radiation.

Having now fully described my invention, what I claim as new, and desire to secure by Letters Patent, is—

1. A hot-air-radiating drum having a central pipe for the circulation of cold air located in the drum and extending out through the closed ends thereof, hot-air chambers at the ends of the drum having openings and communicating with the interior thereof by tubular supports, substantially as and for the purpose set forth.

2. A hot-air-radiating drum, a central cold-air pipe located therein and extending through the closed ends of the drum for the circulation of the air, air-chambers having openings, and oblong tubular supports connecting the chambers with the ends of the drum to form a communication therewith, said supports being arranged with relation to each other substantially as shown and described.

In testimony that I claim the above I have hereunto subscribed my name in the presence of two witnesses.

JOHN P. LYNOTT.

Witnesses:
 JOHN A. LAKE,
 W. H. SHAFFNER.